US011458909B2

(12) United States Patent
Lenagh

(10) Patent No.: US 11,458,909 B2
(45) Date of Patent: Oct. 4, 2022

(54) ADAPTER CLIP

(71) Applicant: Rosemount Aerospace Inc., Burnsville, MN (US)

(72) Inventor: Thomas Lenagh, Farmington, MN (US)

(73) Assignee: Rosemount Aerospace Inc., Burnsville, MN (US)

( * ) Notice: Subject to any disclaimer, the term of this patent is extended or adjusted under 35 U.S.C. 154(b) by 15 days.

(21) Appl. No.: 16/783,816

(22) Filed: Feb. 6, 2020

(65) Prior Publication Data

US 2021/0245684 A1 Aug. 12, 2021

(51) Int. Cl.
*H02G 3/32* (2006.01)
*B60R 16/02* (2006.01)
*F16B 2/20* (2006.01)

(52) U.S. Cl.
CPC ............ *B60R 16/0215* (2013.01); *F16B 2/20* (2013.01); *H02G 3/32* (2013.01)

(58) Field of Classification Search
CPC ............... H01R 13/518; A61M 5/1418; B60R 16/0215; B60R 16/0207; H02G 3/22; H02G 3/30; H02G 3/32; H02G 7/05; F16B 2/20; F16B 2/24; F16B 2/248; F16L 3/137; F16L 3/233; F16L 3/24; F16L 3/245; F16L 3/2431; F16L 3/223; F16L 3/243; F16L 3/00; F16L 3/02; F16L 3/08; F16L 3/22; F16L 3/23; F16L 3/237
USPC ... 248/74.1, 74.2, 74.3, 73, 74.4, 68.1, 67.5, 248/67.7, 69, 72, 63, 65
See application file for complete search history.

(56) References Cited

U.S. PATENT DOCUMENTS

| 1,051,245 | A |   | 1/1913  | Marchal |
|-----------|---|---|---------|---------|
| 1,098,077 | A | * | 5/1914  | Annison .................. E02D 5/08 405/279 |
| 1,129,782 | A | * | 2/1915  | Bissell et al. .......... H01B 17/24 174/155 |
| 1,816,301 | A | * | 7/1931  | Sundell .................... F16B 2/245 24/339 |
| 2,012,562 | A |   | 8/1935  | Gunn |
| 2,354,919 | A |   | 8/1944  | Lockwood |
| 2,915,580 | A | * | 12/1959 | Fletcher .................. H02G 7/12 174/43 |
| 3,042,353 | A | * | 7/1962  | O'Mara ................ F16L 3/1033 248/544 |

(Continued)

FOREIGN PATENT DOCUMENTS

| CN | 103557374 B | 8/2016 |
| EP | 2239487 A1 | 10/2010 |
| EP | 2594835 A1 | 5/2013 |

OTHER PUBLICATIONS

Extended European Search Report for European Patent Application No. 19163773.5, dated Jul. 8, 2019, 8 pages.

(Continued)

*Primary Examiner* — Nkeisha Smith
(74) *Attorney, Agent, or Firm* — Kinney & Lange, P.A.

(57) ABSTRACT

An adapter clip includes a first portion configured to fit within an engine clip or an engine clamp, a second portion including an annular portion, the annular portion being configured to fit around an engine component, and a web portion connected to the annular portion and the first portion. A diameter of the first portion differs from a diameter of the annular portion.

13 Claims, 11 Drawing Sheets

(56) References Cited

U.S. PATENT DOCUMENTS

| | | | | |
|---|---|---|---|---|
| 3,313,009 A * | 4/1967 | Beckererfranks | .......... | F16L 3/13 248/74.2 |
| 3,421,187 A * | 1/1969 | Ryder | .................. | F16L 3/2235 403/391 |
| 3,521,332 A * | 7/1970 | Kramer | .................... | F16B 2/22 403/188 |
| 3,526,934 A * | 9/1970 | Owen, Sr. | ............. | F16L 3/2235 285/154.1 |
| 3,664,621 A * | 5/1972 | Savoie, Jr. | ............ | F16L 3/2235 248/74.1 |
| 3,739,435 A * | 6/1973 | Baker | .................... | F16B 2/185 292/305 |
| 3,892,912 A * | 7/1975 | Hauck | ..................... | H01B 7/04 174/68.3 |
| 3,894,706 A * | 7/1975 | Mizusawa | ............ | F16L 3/2235 248/68.1 |
| 4,273,465 A | 6/1981 | Schoen | | |
| 4,790,574 A | 12/1988 | Wagner et al. | | |
| 4,799,641 A * | 1/1989 | Koreski | ............... | F16L 3/2235 24/329 |
| 5,002,243 A * | 3/1991 | Kraus | .................... | B60R 16/08 248/68.1 |
| 5,115,542 A | 5/1992 | Gehres | | |
| 5,234,185 A | 8/1993 | Hoffman et al. | | |
| 5,390,876 A * | 2/1995 | Hatano | ................. | F16L 3/1075 248/68.1 |
| 5,433,486 A | 7/1995 | Mannl et al. | | |
| 5,454,606 A | 10/1995 | Voss et al. | | |
| 5,494,245 A | 2/1996 | Suzuki et al. | | |
| 5,510,579 A * | 4/1996 | Hammer | ................ | H02G 3/26 174/135 |
| 5,664,607 A * | 9/1997 | van Wassenhove | ........................ B60R 16/0215 138/107 | |
| 5,669,590 A * | 9/1997 | Przewodek | ............ | F16L 3/237 248/68.1 |
| 5,703,330 A * | 12/1997 | Kujawski | ........... | B60R 16/0215 138/157 |
| 5,941,483 A | 8/1999 | Baginski | | |
| 6,061,880 A * | 5/2000 | Senninger | ............... | E03C 1/021 24/335 |
| 6,105,218 A * | 8/2000 | Reekie | ................ | A61M 5/1418 24/115 R |
| 6,317,968 B1 * | 11/2001 | Kawamura | ......... | B60R 16/0215 29/755 |
| 6,390,421 B1 * | 5/2002 | Rudd | ..................... | F16L 3/133 248/62 |
| 6,435,565 B2 | 8/2002 | Potts et al. | | |
| 6,494,413 B1 * | 12/2002 | Saeki | ........................ | F16L 3/06 174/72 A |
| 6,517,031 B2 * | 2/2003 | Uchiyama | ........... | B60T 11/046 248/63 |
| 6,734,364 B2 * | 5/2004 | Price | .................... | H01B 7/0853 174/113 C |
| 6,752,426 B2 * | 6/2004 | Kacines | .................. | B60T 8/329 174/72 A |
| 6,758,500 B2 | 7/2004 | Lehnhardt | | |
| 7,093,808 B2 * | 8/2006 | Yuzuriha | ................ | F16L 33/03 24/20 R |
| 7,533,853 B2 * | 5/2009 | Ogawa | ................ | B60R 16/0215 248/73 |
| 7,600,723 B2 * | 10/2009 | Borchers | .............. | H02G 3/0487 138/112 |
| 7,677,611 B2 | 3/2010 | Holzheu | | |
| 7,887,012 B2 * | 2/2011 | Desai | ...................... | H02G 3/32 248/55 |
| 8,141,912 B2 | 3/2012 | Nyhus | | |
| 8,246,583 B2 * | 8/2012 | Bierman | ............... | A61M 25/02 604/174 |
| 8,317,662 B2 * | 11/2012 | Siipola | .................. | A63B 60/08 482/49 |
| 8,985,531 B2 | 3/2015 | Wood | | |
| 9,045,094 B2 | 6/2015 | Schultz | | |
| 9,534,715 B2 | 1/2017 | Beagen, Jr. | | |
| 9,556,989 B2 | 1/2017 | O'Neil et al. | | |
| 9,653,901 B2 * | 5/2017 | Miyamoto | ............ | F16L 3/1025 |
| 9,726,310 B2 | 8/2017 | Gibb et al. | | |
| 9,857,689 B2 | 1/2018 | Wu et al. | | |
| 9,866,005 B2 * | 1/2018 | Feige | ........................ | H02G 3/32 |
| 10,001,227 B2 * | 6/2018 | Basesme | ............. | A47L 15/4217 |
| 10,487,963 B2 * | 11/2019 | Ruiz | ...................... | F16L 3/2235 |
| 10,663,353 B2 * | 5/2020 | Newlin | .................. | F16B 2/065 |
| 2002/0063190 A1 * | 5/2002 | Buck | ........................ | H02G 3/32 248/74.1 |
| 2002/0104930 A1 * | 8/2002 | Attee | ....................... | F16B 2/065 248/74.1 |
| 2002/0129961 A1 * | 9/2002 | Baker | ................... | B60R 16/0215 174/72 A |
| 2003/0223188 A1 | 12/2003 | Ha et al. | | |
| 2004/0041061 A1 * | 3/2004 | Krohmer | ................. | B25B 5/006 248/74.1 |
| 2005/0116122 A1 | 6/2005 | Nakanishi | | |
| 2005/0166122 A1 | 7/2005 | Parhi | | |
| 2007/0267868 A1 | 11/2007 | Holzheu | | |
| 2008/0105796 A1 * | 5/2008 | Nix | ......................... | F16L 3/222 248/73 |
| 2010/0243824 A1 * | 9/2010 | Desai | ...................... | F16L 3/127 248/65 |
| 2010/0327576 A1 | 12/2010 | Linhorst et al. | | |
| 2011/0315830 A1 | 12/2011 | Eshima et al. | | |
| 2012/0056045 A1 | 3/2012 | Franta | | |
| 2016/0076689 A1 * | 3/2016 | Kato | ..................... | F16L 55/035 248/636 |
| 2016/0238160 A1 * | 8/2016 | Nadeau | ................... | G02B 6/4471 |
| 2017/0122463 A1 | 5/2017 | Vaccaro | | |
| 2017/0175932 A1 * | 6/2017 | Izawa | ................... | F16L 3/2235 |
| 2018/0068765 A1 | 3/2018 | Yamamoto | | |
| 2018/0080579 A1 | 3/2018 | Costigan | | |
| 2018/0216754 A1 | 8/2018 | Ciasulli et al. | | |
| 2019/0226357 A1 * | 7/2019 | Beauquin | ................ | F01D 25/14 |
| 2019/0264834 A1 * | 8/2019 | Breda | ................... | F16L 1/0246 |
| 2019/0285201 A1 * | 9/2019 | Ruiz | ..................... | F16L 3/2235 |
| 2019/0293103 A1 * | 9/2019 | Isaji | ......................... | F16B 7/048 |
| 2020/0072392 A1 * | 3/2020 | Foerg | ....................... | H02G 3/32 |

OTHER PUBLICATIONS

Extended European Search Report for European Patent Application No. 21155859.8, dated Apr. 14, 2021, 8 pages.

* cited by examiner

ADAPTER CLIP

BACKGROUND

The present disclosure relates generally to clips, and in particular, to clips for an engine.

Harnesses are used in aircraft to transmit data from portions of an engine to a control box or computer for engine control and optimization. Harnesses and other engine components are attached to an exterior of the engine via clips and clamps as they are routed around the engine. Such engine clips and clamps are sized to receive a specific harness or engine component. It can be difficult to successfully attach to the engine harnesses or other engine components.

SUMMARY

An adapter clip includes a first portion configured to fit within an engine clip or an engine clamp, a second portion including an annular portion, the annular portion being configured to fit around an engine component, and a web portion connected to the annular portion and the first portion. A diameter of the first portion differs from a diameter of the annular portion.

A method of joining an engine clip or an engine clamp with an engine component includes inserting a first portion of an adapter clip into the engine clip or the engine clamp, and inserting the engine component into an annular portion of a second portion of the adapter clip, the annular portion being connected to the first portion via a web portion of the adapter clip. A diameter of the first portion differs from a diameter of the annular portion.

An adapter clip includes a first portion, the first portion being annular and solid; a second portion including an annular portion and an end portion connected to the annular portion; and a web portion connected to the first portion and the annular portion of the second portion. A diameter of the first portion differs from a diameter of the annular portion.

DETAILED DESCRIPTION

In general, the present disclosure describes an adapter clip that has a first portion that fits into a clip or clamp of an engine and a second portion with an annular portion that fits around a sleeve of a harness, or other engine component, that is larger or smaller than the clip or clamp to join to the existing clip or clamp to the harness, or other engine component. As a result, a new harness, for example, can be installed on an engine using the existing clip or clamp such that the harness mounting hardware need not be changed or updated.

Figure 1A:
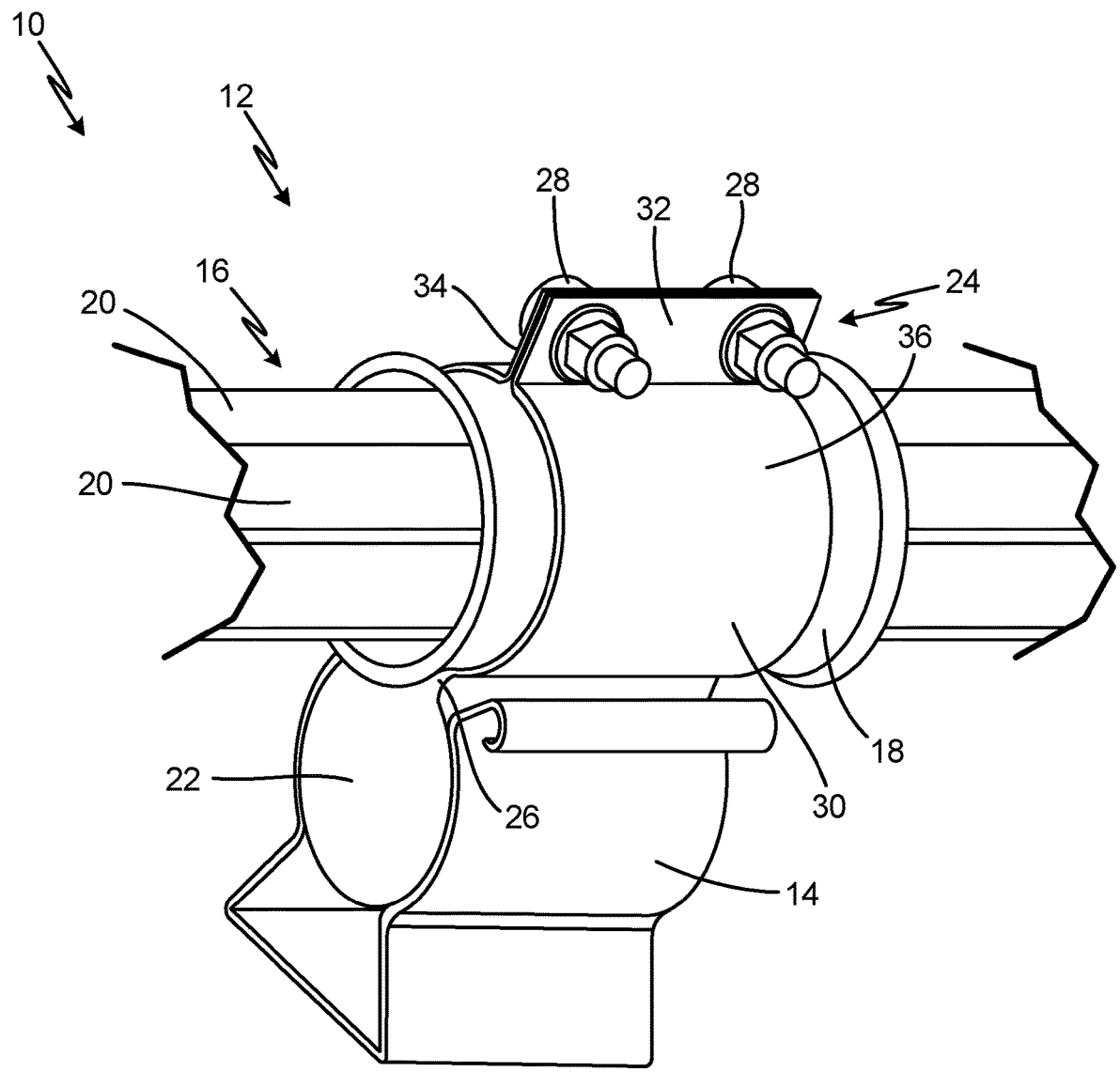
FIG. 1A is an isometric view of an attachment assembly showing an adapter clip joined to an engine clip and a harness.
Figure 1B:
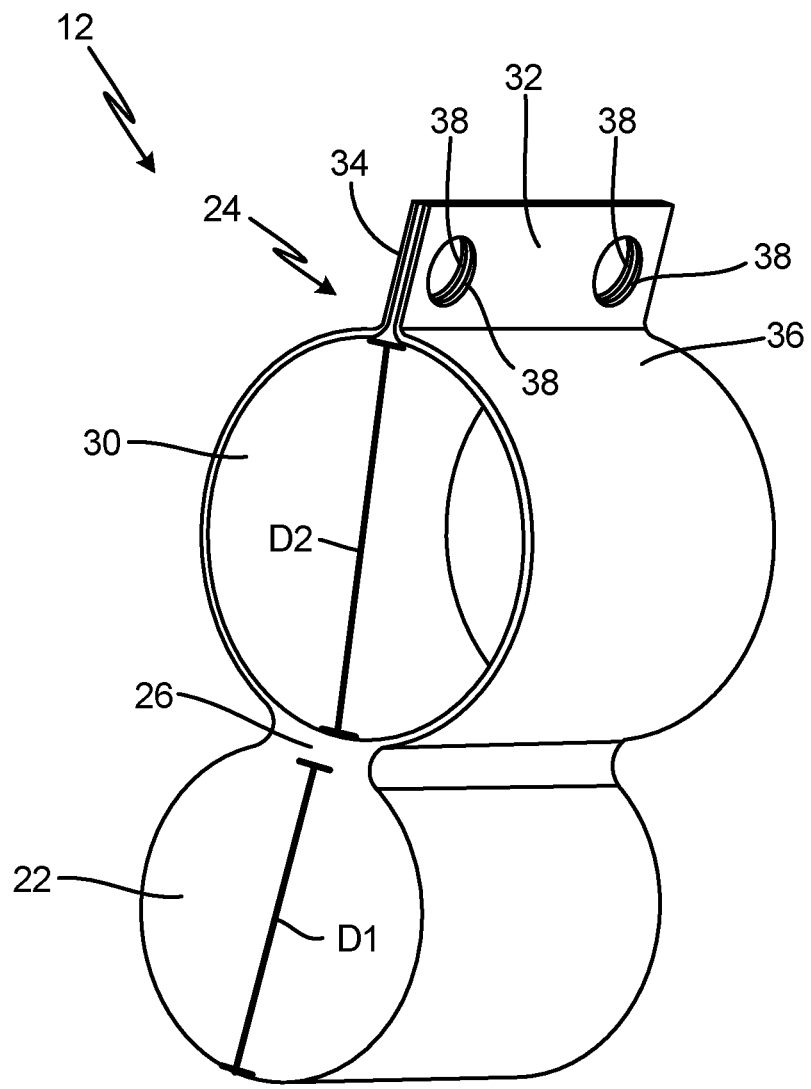
FIG. 1B is an isometric view of the adapter clip.

FIG. 1A is an isometric view of attachment assembly 10 showing adapter clip 12 joined to engine clip 14 and harness 16. FIG. 1B is an isometric view of adapter clip 12. FIGS. 1A and 1B will be discussed together. Attachment assembly 10 includes adapter clip 12, engine clip 14 (shown in FIG. 1A), and harness 16 (shown in FIG. 1A), which includes sleeve 18 and cables 20. Adapter clip 12 includes first portion 22, second portion 24, web portion 26, and fasteners 28 (shown in FIG. 1A). Second portion 24 includes annular portion 30, end portion 32, first side 34, and second side 36. End portion 32 includes holes 38 (shown in FIG. 1B).

Attachment assembly 10 is within an aircraft. A first end of adapter clip 12 is joined to engine clip 14, and a second end of adapter clip 12 is joined to harness 16. Adapter clip 12 is metal. Adapter clip 12 may be formed via bent metal, additive manufacturing, brazing, or any other suitable method. Engine clip 14 is attached to an exterior of the engine (not shown) of the aircraft. Harness 16 is an engine component. In this embodiment, engine clip 14 is attached to harness 16. In alternate embodiments, engine clip 14 may be attached to a fuel line, tubing, ducting, wiring, a hose, or any other suitable engine component. Specifically, adapter clip 12 is joined to sleeve 18 of harness 16. In this embodiment, sleeve 18 is too large to fit within engine clip 14. In alternate embodiments, sleeve 18 may be too small to fit within engine clip 14. Sleeve 18 is tubular and positioned around cables 20 of harness 16 such that cables 20 extend through sleeve 18. Sleeves 18 are attachment points of harness 16 or interfaces to the engine. In this embodiment, sleeve 18 has a lip extending away from cables 20 on each end of sleeve 18. Harness 16 has multiple sleeves 18 along a length of harness 16. In this embodiment, harness 16 has multiple cables 20. In alternate embodiments, harness 16 may have a single cable 20.

Adapter clip 12 has first portion 22 at a first end of adapter clip 12. First portion 22 is dimensioned to fit within engine clip 14. As such, first portion 22 is annular and has diameter D1. Diameter D1 is an outer diameter of first portion 22. Diameter D1 of first portion 22 is sized to fit within engine clip 14. In this embodiment, first portion 22 is solid. In alternate embodiments, first portion 22 may be hollow. First portion 22 has a length that is about equal to the length of engine clip 14. Adapter clip 12 has second portion 24 at a second end of adapter clip 12. Second portion 24 is attached to first portion 22 via web portion 26. A first end of web portion 26 is connected to first portion 22 and a second end of web portion 26 is connected to second portion 24 such that web portion 26 is between first portion 22 and second portion 24. In this embodiment, the length of first portion 22 is about equal to the length of second portion 24 and web portion 26. In alternate embodiments, the length of first portion 22 may differ from the length of web portion 26 and/or second portion 24. Web portion 26 has a width that is smaller than diameter D1 of the first portion 22 and the diameter of second portion 24. Fasteners 28 are connected to a portion of second portion 24 opposite from the portion of second portion 24 connected to first portion 22. In this embodiment, fasteners 28 are screws and nuts. In alternate embodiments, fasteners 28 may be any suitable fastener. In this embodiment, adapter clip 12 includes two fasteners 28. In alternate embodiments, adapter clip 12 may have any number of fasteners or no fasteners.

Second portion 24 has annular portion 30 connected to web portion 26 such that web portion 26 is connected to second portion 24 at annular portion 30. Web portion 26 connects and is between first portion 22 and annular portion 30. Annular portion 30 is annular and hollow. Annular portion 30 is dimensioned to fit around sleeve 18 of harness 16. Annular portion 30 has inner diameter D2. Diameter D2 is sized to fit around sleeve 18. As such, diameter D2 may vary based on the size of sleeve 18. Diameter D2 differs from diameter D1. In this embodiment, diameter D2 is larger than diameter D1. In alternate embodiments diameter D2 may be smaller than diameter D1. In this embodiment, a length of annular portion 30 is about equal to the length of first portion 22 and web portion 26 such that web portion 26 extends an entirety of the length of first portion 22 and the length of annular portion 30. In alternate embodiments, the length of annular portion 30 may differ from the length of first portion 22 and/or web portion 26. End portion 32 is connected to a portion of annular portion 30 opposite from the portion of annular portion 30 connected to web portion 26. In alternate embodiments, end portion 32 may be connected to a portion of annular portion 30 up to about 45 degrees from the portion of annular portion 30 opposite from the portion of annular portion 30 connected to web portion 26. Second portion 24 has first side 34 making up a first side of second portion 24 and second side 36 making up a second side of section portion 24. As such, first side 34 and second side 36 form annular portion 30 and end portion 32. First side 34 and second side 36 at end portion 32 form opposing flanges. End portion 32 has two holes 38 extending through end portion 32 from a first side of first side 34 to a second side of first side 34 and two holes 38 extending through end portion 32 from a first side of second side 36 to a second side of second side 36. Holes 38 extending through first side 34 are in alignment with holes 38 extending through second side 36. Holes 38 are sized to accept fasteners 28.

Attachment assembly 10 attaches harness 16 to an exterior of the engine of an aircraft as harness 16 is routed around the engine. Harness 16 extends from a sensor at a portion of the engine to a control box or computer that reads signals from the sensor. As such, harness 16 transmits data from the engine via cables 20 for optimization of engine controls and thrust.

More specifically, adapter clip 12 joins and secures harness 16 to engine clip 14. Adapter clip 12 is metal to withstand the harsh environment, including extreme temperatures and vibration, within the aircraft engine. Sleeves 18 act as attachment points for harness 16. As such, first portion 22 attaches adapter clip 12 to engine clip 14 and second portion 24 attaches adapter clip 12 to sleeve 18 of harness 16. Thus, harness 16 is attached to engine clip 14 via adapter clip 12.

First portion 22 of adapter clip 12 is inserted into engine clip 14 such that first portion 22 is within engine clip 14. Web portion 26 provides space between first portion 22 and annular portion 30 such that engine clip 14 can fit around first portion 22. Sleeve 18 of harness 16 is inserted into annular portion 30 of second portion 24 of adapter clip 12. As such, sleeve 18 is within annular portion 30. To insert sleeve 18 of harness 16 into annular portion 30, first side 34 and second side 36 of second portion 24 are pulled apart from each other at end portion 32. Sleeve 18 is inserted into annular portion 30 of second portion 24 while first side 34 and second side 36 are spaced apart. First side 34 and second side 36 are subsequently released such that first side 34 and second side 36 at end portion 32 are adjacent each other. First side 34 and second side 36 are secured together via fasteners 28 and holes 38 at end portion 32. As such, second portion 24 is fastened together and secured to sleeve 18 of harness 16 at end portion 32. Adapter clip 12 connects harness 16 to engine clip 14. Harness 16 is secured to engine clip 14 via adapter clip 12 such that harness 16 is right above engine clip 14.

Harness 16 does not fit within engine clip 14, but can still be installed on the engine and joined to engine clip 14 via adapter clip 12. As such, engine clips 14 can be easily adapted to harnesses 16 or other engine components with interfaces to the engine that have changed size. For example, a harness may be redesigned to result in sleeves that have changed size. While the engine clip may be sized to receive a specific harness, the engine clip can still attach to the redesigned harness via the adapter clip even though the sleeve no longer fits within the engine clip. Thus, adapter clips 12 allow harnesses or other engine components to be redesigned and installed on the engine using existing engine clips while accommodating the new size of the harnesses or engine components. As a result, the engine clips do not need to be changed or updated. In some locations, engine clips cannot be changed or are difficult to change, such as in locations that are difficult to access. Further, older engines may not accommodate updated engine clips. Instead, new harnesses or other engine components can be installed via adapter clips 12. Additionally, engine clips of the same size can be installed throughout the engine and various adapter clips can be used to attach different engine components (the first portion of each adapter clip having the same size and the second portion of each adapter clip having a size that varies to correspond with respective engine components), simplifying engine clip design and installation and engine component redesign and installation.

Because first portion 22 is solid, first portion 22 is more rigid and fits more easily into engine clip 14. The length of first portion 22 is equal to the length of engine clip to provide proper positioning of harness 16 on the engine. Web portion 26 extending the entirety of the length of first portion 22 and annular portion 30 provides structural support to adapter clip 12. Web portion 26 also provides space between first portion 22 and annular portion 30 so that sleeve 18 of harness 16 is not resting on engine clip 14, avoiding potential wear points. First side 34 and second side 36 can be pulled apart to insert sleeve 18 into second portion 24, allowing adapter clip 12 to have a simpler design, which is suitable for harsh environments. End portion 32 is connected to annular portion 30 opposite from web portion 26 for ease of accessibility when securing second portion 24. Fasteners 28 provide a strong and secure connection that can withstand engine vibrations.

Figure 2:
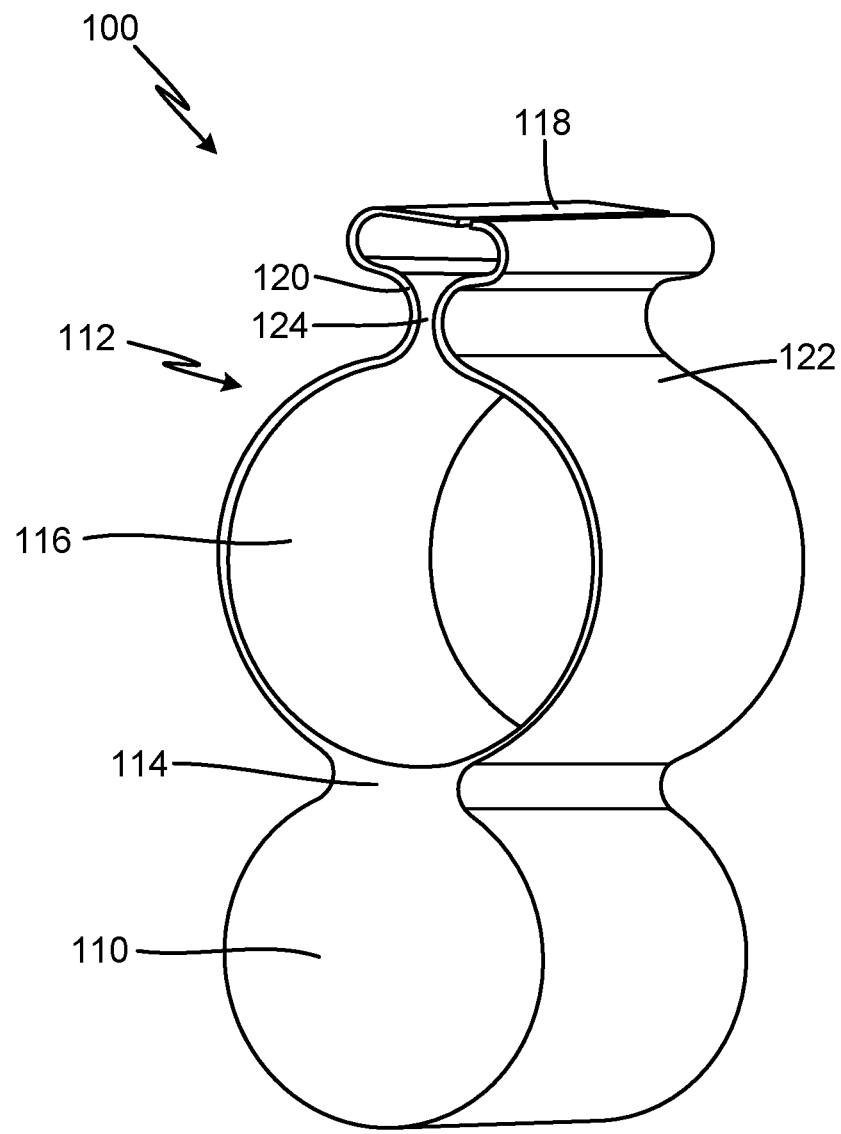
FIG. 2 is an isometric view of a second embodiment of an adapter clip.

FIG. 2 is an isometric view of adapter clip 100. Adapter clip 100 includes first portion 110, second portion 112, and web portion 114. Second portion 112 includes annular portion 116, end portion 118, first side 120, and second side 122. End portion 118 includes gap 124.

Adapter clip 100 has generally the same structure and function as adapter clip 12 described with respect to FIGS. 1A and 1B, including first portion 110, second portion 112, and web portion 114, with second portion 112 including annular portion 116, end portion 118, first side 120, and second side 122. However, adapter clip 100 does not include fasteners, and end portion 118 has gap 124 and does not include holes.

A crimped portion of first side 120 and second side 122 of second portion 112 form end portion 118. End portion 118 has gap 124 between first side 120 and second side 122 and adjacent annular portion 116. Sleeve 18 (shown in FIG. 1A) of harness 16 (shown in FIG. 1A) is inserted into annular portion 116 prior to crimping second portion 112. Once the sleeve is within annular portion 116, first side 120 and second side 122 are crimped, deforming the metal of first side 120 and second side 122 to form end portion 118, to secure first side 120 and second side 122 together at end portion 118. Thus, second portion 112 of adapter clip 100 is secured to sleeve 18 of harness 16. First side 120 and second side 122 may be crimped via pinching with pliers, or any other suitable method. First side 120 and second side 122 are crimped to an extent that they provide secure attachment to sleeve 18, but also form gap 124.

Because end portion 118 does not require fasteners or any other additional parts to close adapter clip 100 and secure adapter clip 100 to a harness, adapter clip 100 requires less components, decreasing the chance of foreign object damage within the engine.

Figure 3:
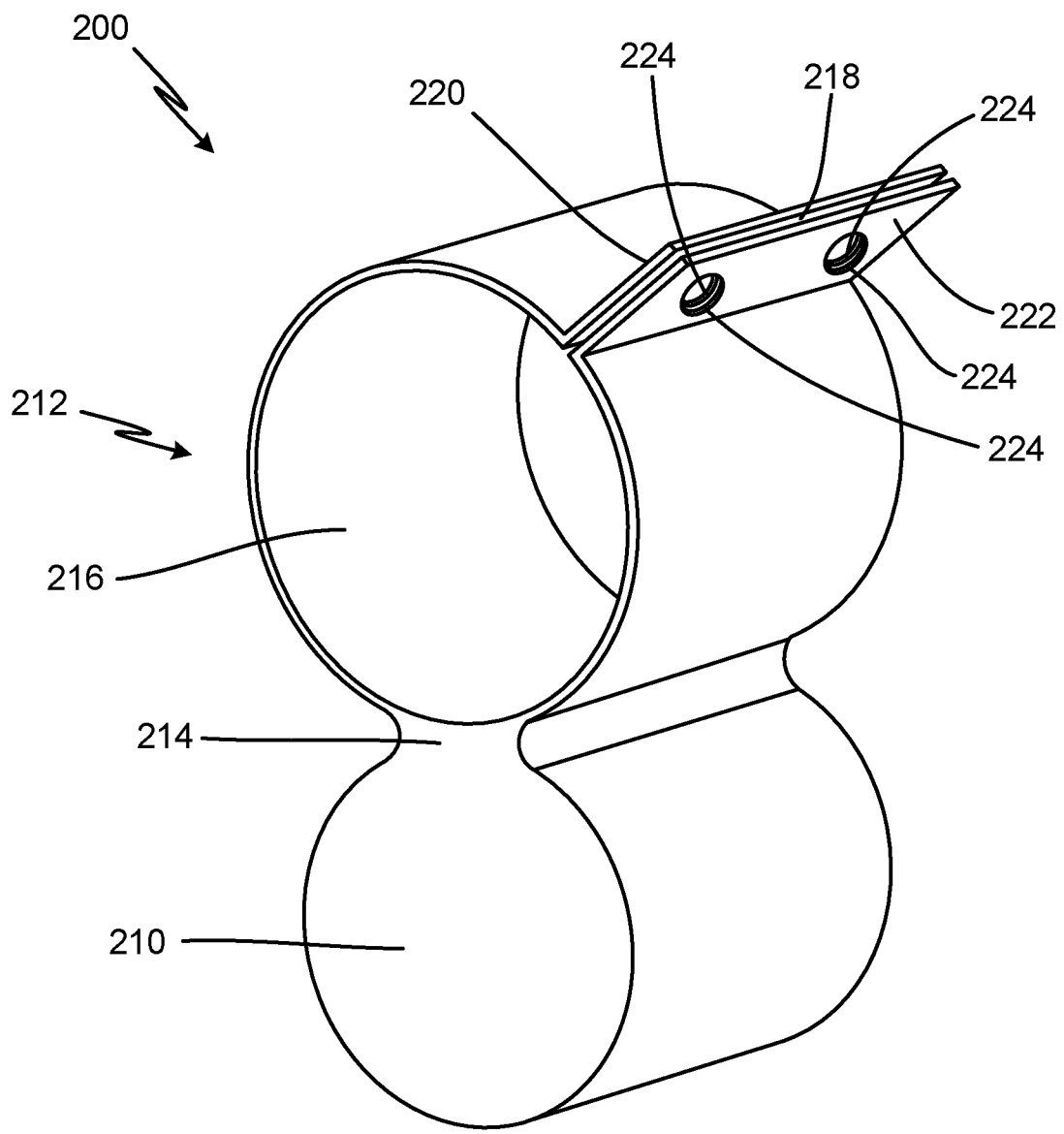
FIG. 3 is an isometric view of a third embodiment of an adapter clip.

FIG. 3 is an isometric view of adapter clip 200. Adapter clip 200 includes first portion 210, second portion 212, and web portion 214. Second portion 212 includes annular portion 216, end portion 218, first side 220, and second side 222. End portion 218 includes holes 224.

Adapter clip 200 has generally the same structure and function as adapter clip 12 described with respect to FIGS. 1A and 1B, including first portion 210, second portion 212, and web portion 214, with second portion 212 including annular portion 216, end portion 218, first side 220, and second side 222. However, adapter clip 200 has end portion 218 connected to a portion of annular portion 216 about 45 degrees from the portion of annular portion 216 opposite from the portion of annular portion 216 connected to web portion 214.

End portion 218 may be connected to annular portion 216 up to 45 degrees from the portion of annular portion 216 opposite from the portion of annular portion 216 connected to web portion 214. Varying the location of end portion 218 optimizes accessibility to end portion 218 for inserting sleeve 18 (shown in FIG. 1A) of harness 16 (shown in FIG. 1A) and securing second portion 212 to sleeve 18, such as with fasteners (28) shown in FIG. 1A.

Figure 4:
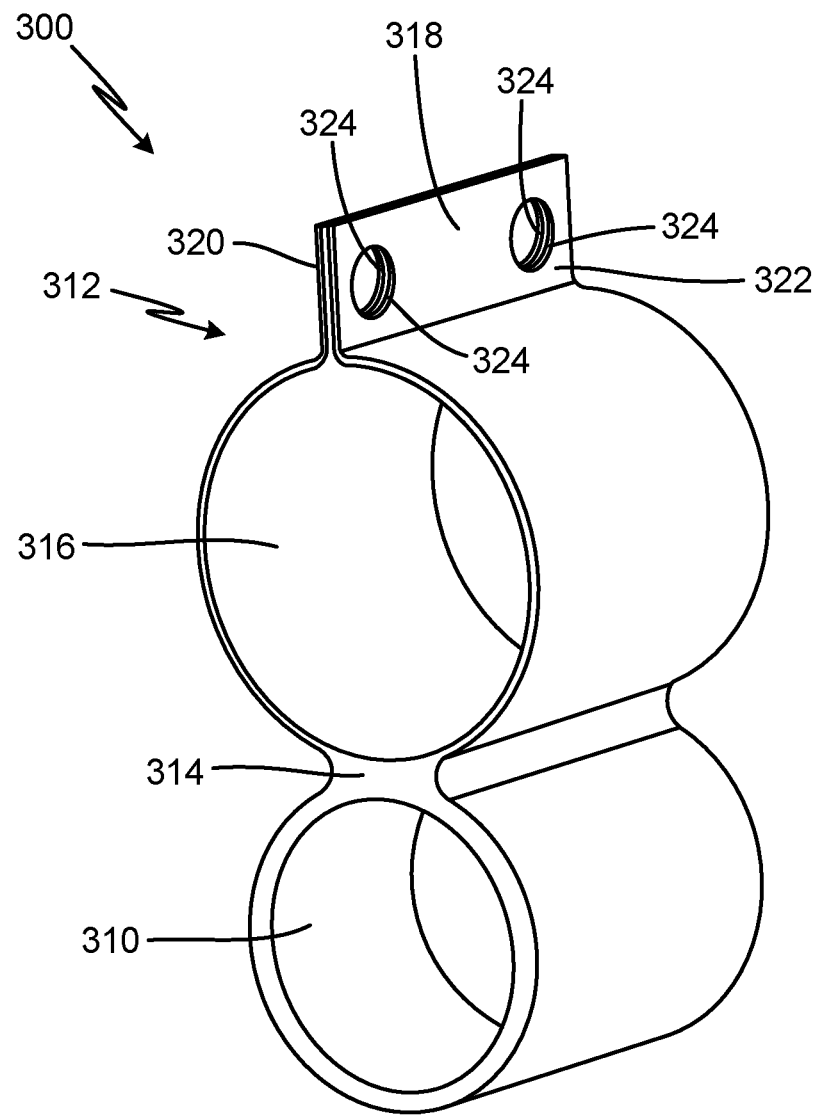
FIG. 4 is an isometric view of a fourth embodiment of an adapter clip.

FIG. 4 is an isometric view of adapter clip 300. Adapter clip 300 includes first portion 310, second portion 312, and web portion 314. Second portion 312 includes annular portion 316, end portion 318, first side 320, and second side 322. End portion 318 includes holes 324.

Adapter clip 300 has generally the same structure and function as adapter clip 12 described with respect to FIGS. 1A and 1B, including first portion 310, second portion 312, and web portion 314, with second portion 312 including annular portion 316, end portion 318, first side 320, and second side 322. However, first portion 310 is hollow rather than solid.

First portion 310 is hollow while still maintaining rigidity to engage with engine clip 14 (shown in FIG. 1A). Because first portion 310 is hollow, adapter clip 300 is lighter. Additionally, adapter clip 300 can be formed of a single piece of bent metal, simplifying construction.

Figure 5:
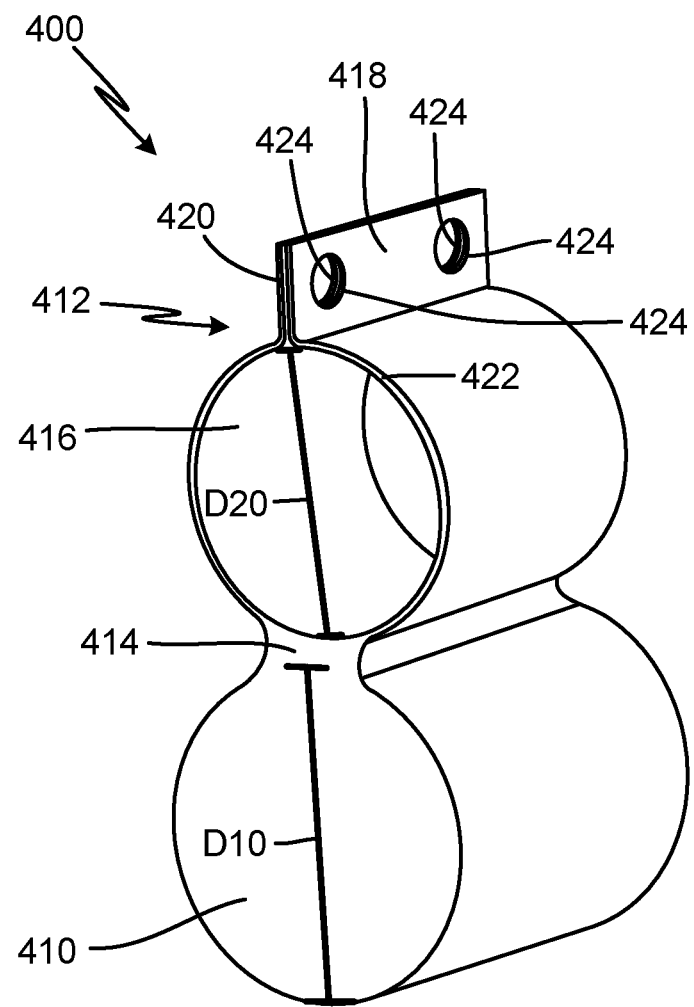
FIG. 5 is an isometric view of a fifth embodiment of an adapter clip.

FIG. 5 is an isometric view of adapter clip 400. Adapter clip 400 includes first portion 410, second portion 412, and web portion 414. Second portion 412 includes annular portion 416, end portion 418, first side 420, and second side 422. End portion 418 includes holes 424.

Adapter clip 400 has generally the same structure and function as adapter clip 12 described with respect to FIGS. 1A and 1B, including first portion 410, second portion 412, and web portion 414, with second portion 412 including annular portion 416, end portion 418, first side 420, and second side 422. However, diameter D10 of first portion 410 is larger than diameter D20 of annular portion 416.

In this embodiment, a sleeve of a harness, or other engine component, is too small to fit within engine clip 14 (shown in FIG. 1A). Diameter D10 is an outer diameter of first portion 410. Diameter D20 is an inner diameter of annular portion 416. Diameter D20 is sized to fit around a smaller sleeve or other engine component. Adapter clip 400 joins the smaller sleeve of the harness to engine clip 14 such that existing engine clip 14 can still be used.

Figure 6A:
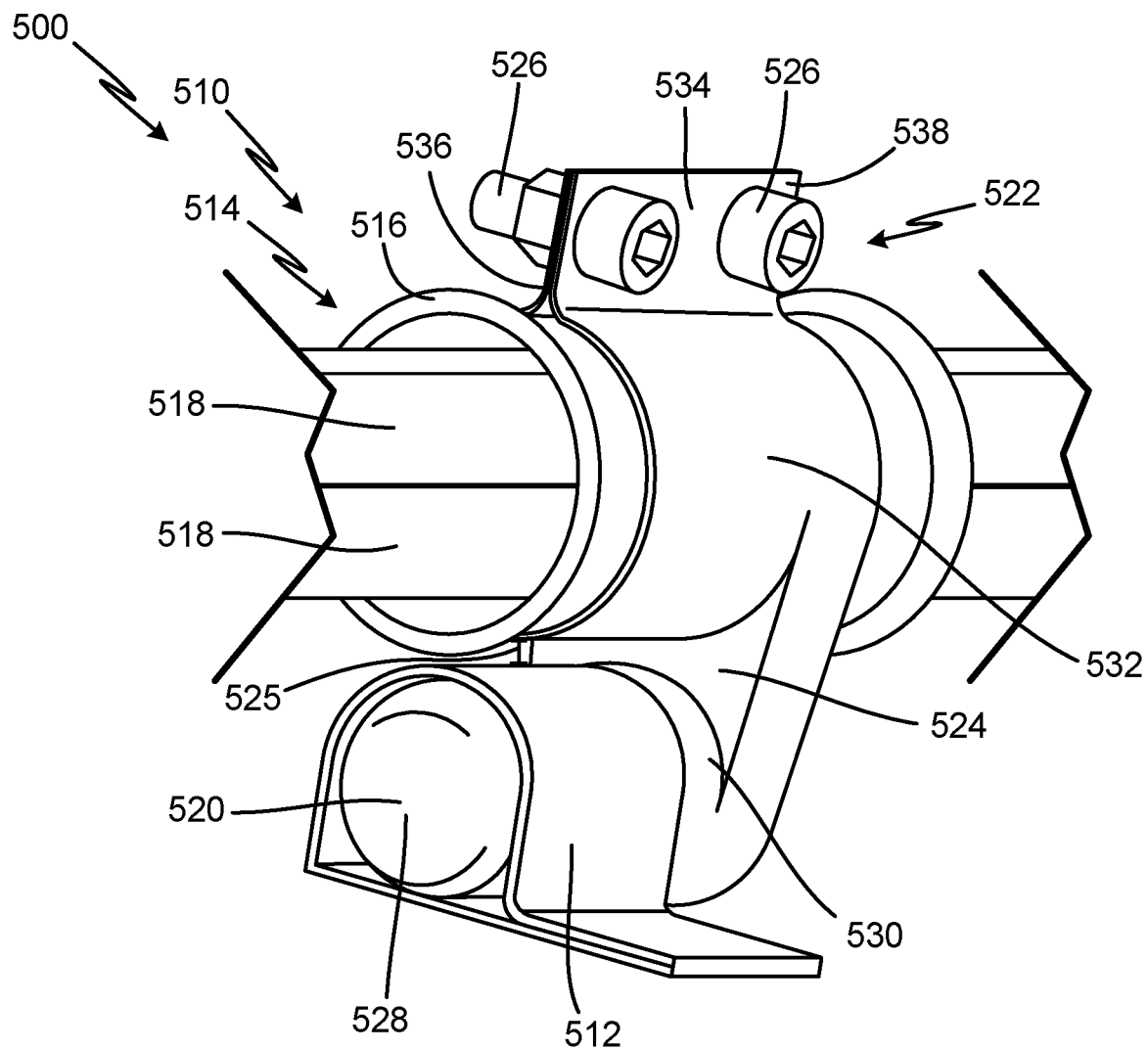
FIG. 6A is an isometric view of an attachment assembly showing a sixth embodiment of an adapter clip joined to an engine clamp and a harness.
Figure 6B:
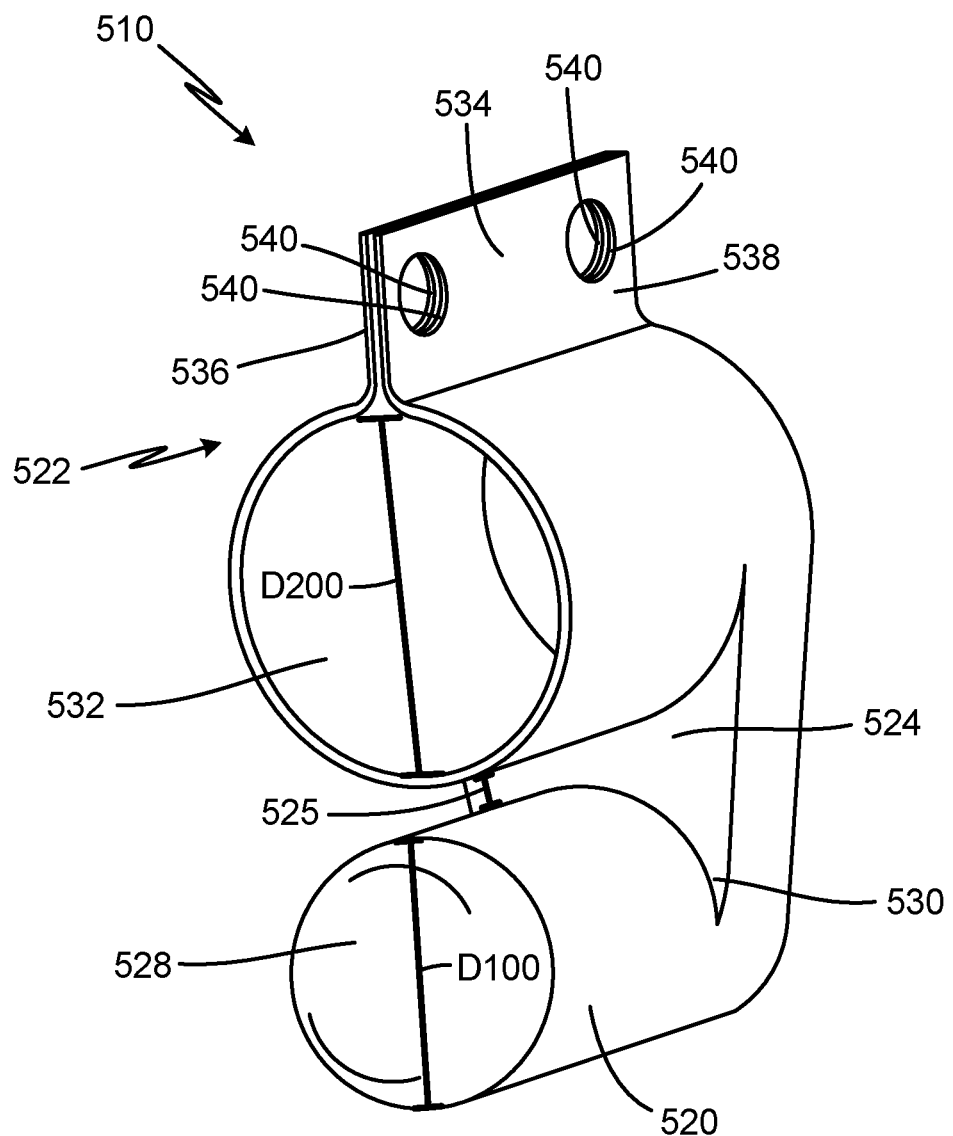
FIG. 6B is an isometric view of the sixth embodiment of the adapter clip.

FIG. 6A is an isometric view of attachment assembly 500 showing adapter clip 510 joined to engine clamp 512 and harness 514. FIG. 6B is an isometric view of adapter clip 510. FIGS. 6A and 6B will be discussed together. Attachment assembly 500 includes adapter clip 510, engine clamp 512 (shown in FIG. 6A), and harness 514 (shown in FIG. 6A), which includes sleeve 516 and cables 518. Adapter clip 510 includes first portion 520, second portion 522, web portion 524, gap 525, and fasteners 526 (shown in FIG. 6A). First portion 520 includes first end 528 and second end 530. Second portion 522 includes annular portion 532, end portion 534, first side 536, and second side 538. End portion 534 includes holes 540 (shown in FIG. 6B).

Attachment assembly 500 is within an aircraft. A first end of adapter clip 510 is joined to engine clamp 512, and a second end of adapter clip 510 is joined to harness 514. Adapter clip 510 is metal. Adapter clip 510 may be formed via bent metal, additive manufacturing, brazing, or any other suitable method. Engine clamp 512 is attached to an exterior of the engine (not shown) of the aircraft. Engine clamp 512 is a P-clamp. Harness 514 is an engine component. In this embodiment, engine clamp 512 is attached to harness 514. In alternate embodiments, engine clamp 512 may be attached to a fuel line, tubing, ducting, wiring, a hose, or any other suitable engine component. Specifically, adapter clip 510 is joined to sleeve 516 of harness 514. In this embodiment, sleeve 516 is too large to fit within engine clamp 512. In alternate embodiments, sleeve 516 may be too small to fit within engine clamp 512. Sleeve 516 is tubular and positioned around cables 518 of harness 514 such that cables 518 extend through sleeve 516. Sleeves 516 are attachment points of harness 514 or interfaces to the engine. In this embodiment, sleeve 516 has a lip extending away from cables 518 on each end of sleeve 516. Harness 514 has multiple sleeves 516 along a length of harness 514. In this embodiment, harness 514 has multiple cables 518. In alternate embodiments, harness 514 may have a single cable 518.

Adapter clip 510 has first portion 520 at a first end of adapter clip 510. First portion 520 is dimensioned to fit within engine clamp 512. As such, first portion 520 is annular and has diameter D100. Diameter D100 is an outer diameter of first portion 520. Diameter D100 of first portion 520 is sized to fit within engine clamp 512. First portion 520 may be solid or hollow. Adapter clip 510 has second portion 522 at a second end of adapter clip 510. Second portion 522 is attached to first portion 520 via web portion 524. Web portion 524 forms gap 525 between first portion 520 and second portion 522. Fasteners 526 are connected to a portion of second portion 522 opposite from the portion of second portion 522 connected to first portion 520. In this embodiment, fasteners 526 are screws and nuts. In alternate embodiments, fasteners 526 may be any suitable fastener. In this embodiment, adapter clip 510 includes two fasteners 526. In alternate embodiments, adapter clip 510 may have any number of fasteners or no fasteners. First portion 520 has first end 528 opposite second end 530. First end 528 is a rounded free end. Second end 530 is connected to a first side of web portion 524 at a first end of web portion 524. Second portion 522 is connected to a second end of web portion 524 to form gap 525.

Second portion 522 has annular portion 532 connected to the second end of web portion 524 such that web portion 524 is connected to second portion 522 at annular portion 532. Web portion 524 connects first portion 520 and annular portion 532. Gap 525 is formed between first portion 520 and annular portion 532. Annular portion 532 is annular and hollow. Annular portion 532 is dimensioned to fit around sleeve 516 of harness 514. Annular portion 532 has inner diameter D200. Diameter D200 is sized to fit around sleeve 516. As such, diameter D200 may vary based on the size of sleeve 516. Diameter D200 differs from diameter D100. In this embodiment, diameter D200 is larger than diameter D100. In alternate embodiments diameter D200 may be smaller than diameter D100. End portion 534 is connected to a portion of annular portion 532 opposite from the portion of annular portion 532 adjacent gap 525. In alternate embodiments, end portion 534 may be connected to a portion of annular portion 532 up to about 45 degrees from the portion of annular portion 532 opposite from the portion of annular portion 532 adjacent gap 525. Second portion 522 has first side 536 making up a first side of second portion 522 and second side 538 making up a second side of section portion 522. As such, first side 536 and second side 538 form annular portion 532 and end portion 534. End portion 534 has two holes 540 extending through end portion 534 from a first side of first side 536 to a second side of first side 536 and two holes 540 extending through end portion 534 from a first side of second side 538 to a second side of second side 538. Holes 540 extending through first side 536 are in alignment with holes 540 extending through second side 538. Holes 540 are sized to accept fasteners 526.

Attachment assembly 500 attaches harness 514 to an exterior of the engine of an aircraft as harness 514 is routed around the engine. Harness 514 extends from a sensor at a portion of the engine to a control box or computer that reads signals from the sensor. As such, harness 514 transmits data from the engine via cables 518 for optimization of engine controls and thrust.

More specifically, adapter clip 510 joins and secures harness 514 to engine clamp 512. Adapter clip 510 is metal to withstand the harsh environment, including extreme temperatures and vibration, within the aircraft engine. Sleeves 516 act as attachment points for harness 514. As such, first portion 520 attaches adapter clip 510 to engine clamp 512 and second portion 522 attaches adapter clip 510 to sleeve 516 of harness 514. As such, harness 514 is attached to engine clamp 512 via adapter clip 510.

First portion 520 of adapter clip 510 is inserted into engine clamp 512 such that first portion 520 is within engine clamp 512. Specifically, because first end 528 is a free end, first end 528 can be inserted into the space formed by engine clamp 512 such that engine clamp 512 surrounds first portion 520. Web portion 524 forms gap 525 between first portion 520 and annular portion 532 such that engine clamp 512 can be inserted into gap 525 and fit entirely around first portion 520. Sleeve 516 of harness 514 is inserted into annular portion 532 of second portion 522 of adapter clip 510. As such, sleeve 516 is within annular portion 532. To insert sleeve 516 of harness 514 into annular portion 532, first side 536 and second side 538 of second portion 522 are pulled apart from each other at end portion 534. Sleeve 516 is inserted into annular portion 532 of second portion 522 while first side 536 and second side 538 are spaced apart. First side 536 and second side 538 are subsequently released such that first side 536 and second side 538 at end portion 522 are adjacent each other. First side 536 and second side 538 are secured together via fasteners 526 and holes 540 at end portion 534. As such, second portion 522 is fastened together and secured to sleeve 516 of harness 514 at end portion 534. Adapter clip 510 connects harness 514 to engine clamp 512. Harness 514 is secured to engine clamp 512 via adapter clip 510 such that harness 514 is right above engine clamp 512.

Harness 514 does not fit within engine clamp 512, but can still be installed on the engine and joined to engine clamp 512 via adapter clip 510. As such, engine clamps 512 can be easily adapted to harnesses 514 or other engine components with interfaces to the engine that have changed size. For example, a harness may be redesigned to result in sleeves that have changed size. While the engine clamp may be sized to receive a specific harness, the engine clamp can still attach to the redesigned harness via the adapter clip even though the sleeve no longer fits within the engine clamp. Thus, adapter clips 510 allow harnesses or other engine components to be redesigned and installed on the engine using existing engine clamps while accommodating the new size of the harnesses or engine components. As a result, the engine clamps do not need to be changed or updated. In some locations, engine clamps cannot be changed or are difficult to change, such as in locations that are difficult to access. Further, older engines may not accommodate updated engine clamps. Instead, new harnesses or other engine components can be installed via adapter clips 510. Additionally, engine clamps of the same size can be installed throughout the engine and various adapter clips can be used to attach different engine components (the first portion of each adapter clip having the same size and the second portion of each adapter clip having a size that varies to correspond with respective engine components), simplifying engine clamp design and installation and engine component redesign and installation.

When first portion 520 is solid, first portion 520 is more rigid and fits more easily into engine clamp 512. When first portion 520 is hollow, adapter clip 510 is lighter. Further, because first end 528 of first portion 520 is rounded, first portion 520 can more easily be inserted into the opening of engine clamp 512. Engine clamp 512 does not have an opening like that of engine clip 14 shown in FIG. 1A. As such, web portion 524 forms gap 525 to allow first portion 520 to slide into the space within engine clamp 512 and engine clamp 512 to slide into gap 525 while also providing structural support to adapter clip 510. Web portion 524 also provides gap 525 between first portion 520 and annular portion 532 so that sleeve 516 of harness 514 is not resting on engine clamp 512, avoiding potential wear points. First side 536 and second side 538 can be pulled apart to insert sleeve 516 into second portion 522, allowing adapter clip 510 to have a simpler design, which is suitable for harsh environments. End portion 534 is connected to annular portion 532 opposite from gap 525 for ease of accessibility when securing second portion 522. Fasteners 526 provide a strong and secure connection that can withstand engine vibrations.

Figure 7:
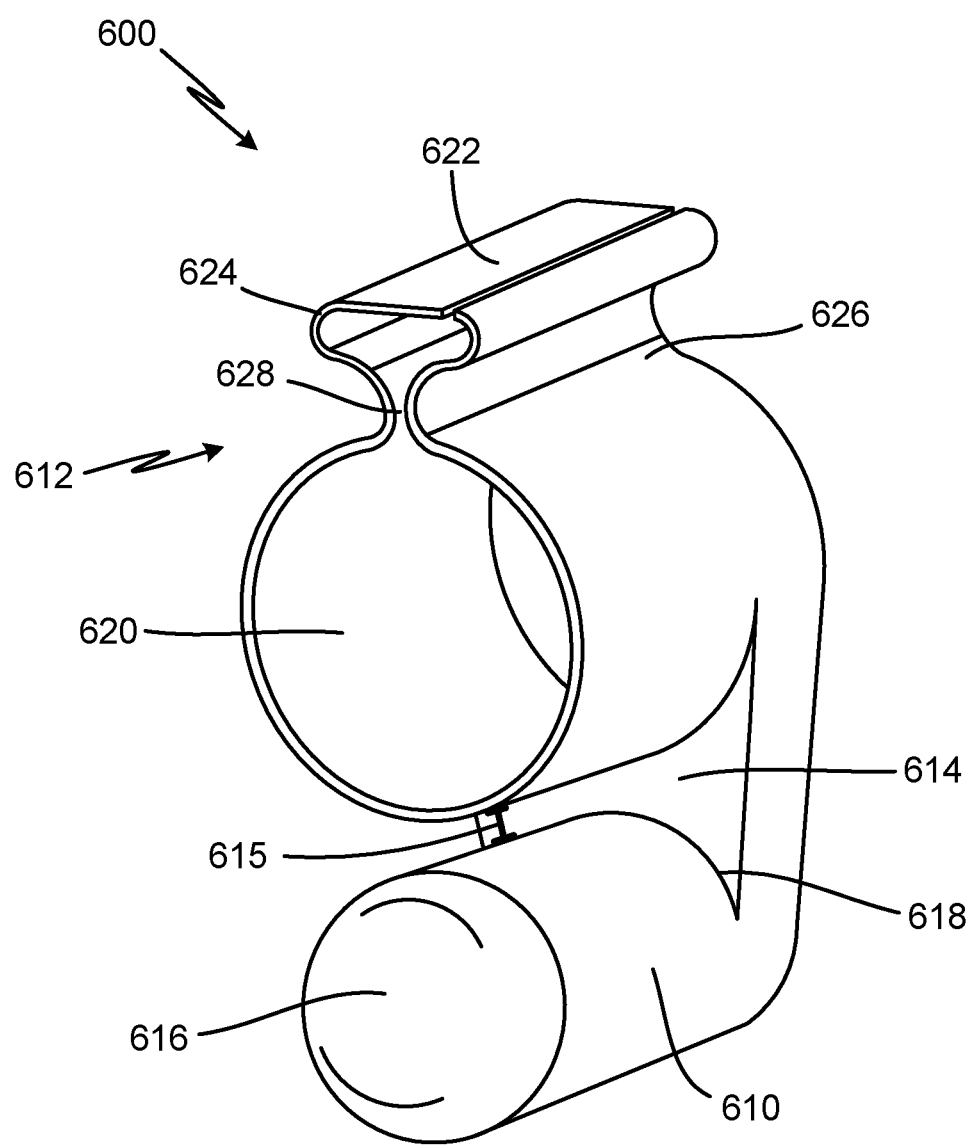
FIG. 7 is an isometric view of a seventh embodiment of an adapter clip.

FIG. 7 is an isometric view of adapter clip 600. Adapter clip 600 includes first portion 610, second portion 612, web portion 614, and gap 615. First portion 610 includes first end 616 and second end 618. Second portion 612 includes annular portion 620, end portion 622, first side 624, and second side 626. End portion 622 includes gap 628.

Adapter clip 600 has generally the same structure and function as adapter clip 510 described with respect to FIGS. 6A and 6B, including first portion 610, second portion 612, gap web portion 610, and gap 615, with first portion 610 including first end 616 and second end 618 and second portion 612 including annular portion 620, end portion 622, first side 624, and second side 626. However, adapter clip 600 does not include fasteners, and end portion 622 has gap 628 and does not include holes.

A crimped portion of first side 624 and second side 626 of second portion 612 form end portion 622. End portion 622 has gap 628 between first side 624 and second side 626 and adjacent annular portion 620. Sleeve 516 (shown in FIG. 6A) of harness 514 (shown in FIG. 6A) is inserted into annular portion 620 prior to crimping second portion 612. Once the sleeve is within annular portion 620, first side 624 and second side 626 are crimped, deforming the metal of first side 624 and second side 626 at end portion 622, to secure first side 624 and second side 626 together at end portion 622, thus securing second portion 612 of adapter clip 600 to sleeve 516 of harness 514. First side 624 and second side 626 may be crimped via pinching with pliers, or any other suitable method. First side 624 and second side 626 are crimped to an extent that they provide secure attachment, but also form gap 628.

Because end portion 622 does not require fasteners or any other additional parts to close adapter clip 600 and secure adapter clip 600 to a harness, adapter clip 600 requires less components, decreasing the chance of foreign object damage within the engine.

Figure 8:
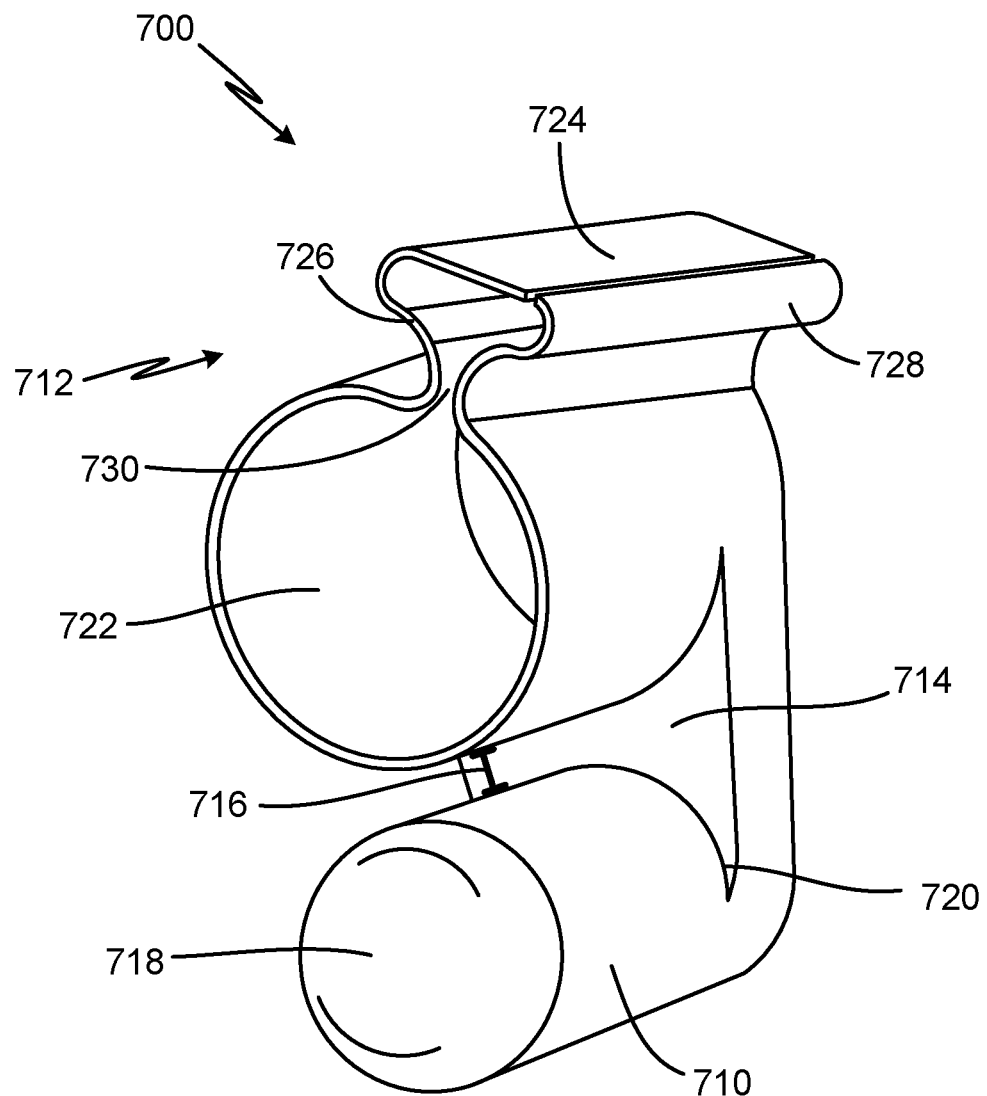
FIG. 8 is an isometric view of an eighth embodiment of an adapter clip.

FIG. 8 is an isometric view of adapter clip 700. Adapter clip 700 includes first portion 710, second portion 712, web portion 714, and gap 716. First portion 710 includes first end 718 and second end 720. Second portion 712 includes annular portion 722, end portion 724, first side 726, and second side 728. End portion 724 includes gap 730.

Adapter clip 700 has generally the same structure and function as adapter clip 600 described with respect to FIG. 7, including first portion 710, second portion 712, web portion 714, and gap 716, with first portion 710 including first end 718 and second end 720 and second portion 712 including annular portion 722, end portion 724, first side 726, and second side 728. However, adapter clip 700 has end portion 724 connected to a portion of annular portion 722 about 45 degrees from the portion of annular portion 722 opposite from the portion of annular portion 722 adjacent gap 716.

End portion 724 may be connected to annular portion 722 up to 45 degrees from the portion of annular portion 722 opposite from the portion of annular portion 722 adjacent gap 716. Varying the location of end portion 724 optimizes accessibility to end portion 724 for inserting sleeve 516 (shown in FIG. 6A) of harness 514 (shown in FIG. 6A) and securing second portion 712 to sleeve 516, such as via crimping.

Figure 9:
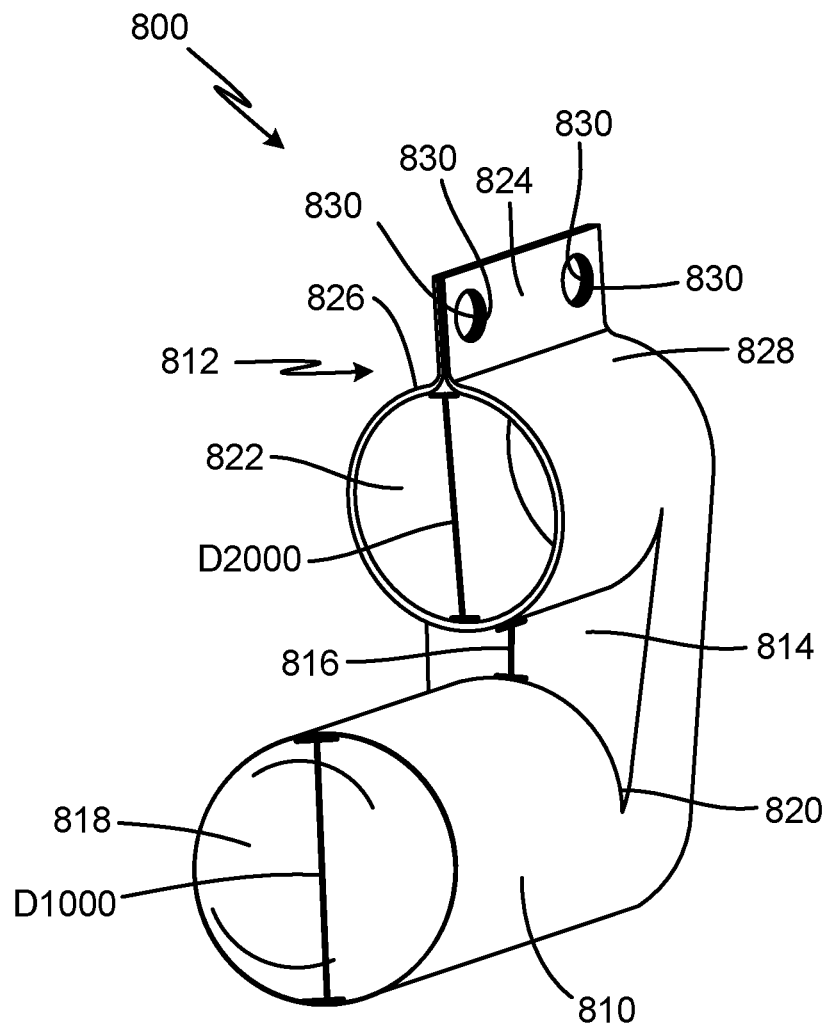
FIG. 9 is an isometric view of a ninth embodiment of an adapter clip.

FIG. 9 is an isometric view of adapter clip 800. Adapter clip 800 includes first portion 810, second portion 812, web portion 814, gap 816, and fasteners 526 (shown in FIG. 6A). First portion 810 includes first end 818 and second end 820. Second portion 812 includes annular portion 822, end portion 824, first side 826, and second side 828. End portion 824 includes holes 830.

Adapter clip 800 has generally the same structure and function as adapter clip 510 described with respect to FIGS. 6A and 6B, including first portion 810, second portion 812, web portion 814, and gap 816 with second portion 812 including annular portion 822, end portion 824, first side 826, and second side 828. However, diameter D1000 of first portion 810 is larger than diameter D2000 of annular portion 822.

In this embodiment, a sleeve of a harness, or other engine component, is too small to fit within engine clamp 512 (shown in FIG. 6A). Diameter D1000 is an outer diameter of first portion 810. Diameter D2000 is an inner diameter of annular portion 822. Diameter D2000 is sized to fit around a smaller sleeve or other engine component. Adapter clip 800 joins the smaller sleeve of the harness to engine clamp 512 such that existing engine clamp 512 can still be used.

The various features described with respect to adapter clips 12, 100, 200, 300, 400, 510, 600, 700, and 800 may be included in any combination on a single adapter clip. Further, multiple adapter clips of the same or differing sizes and having the same or various combinations of features may be used along the engine of an aircraft.

Discussion of Possible Embodiments

The following are non-exclusive descriptions of possible embodiments of the present invention.

An adapter clip includes a first portion configured to fit within an engine clip or an engine clamp; a second portion including an annular portion, the annular portion being configured to fit around an engine component; and a web portion connected to the annular portion and the first portion; wherein a diameter of the first portion differs from a diameter of the annular portion.

The adapter clip of the preceding paragraph can optionally include, additionally and/or alternatively, any one or more of the following features, configurations and/or additional components:

The engine component is a harness.

The second portion is configured to fit around a sleeve of the harness.

The first portion is annular.

The first portion is solid.

The first portion is hollow.

The web portion is between the first portion and the annular portion.

A length of the first portion is equal to a length of the annular portion, and the web portion extends an entirety of the length of the first portion and the length of the annular portion.

The web portion is connected to an end of the first portion.

A gap is between the first portion and the annular portion.

The first portion has a rounded end.

The diameter of the first portion is smaller than the diameter of the annular portion.

The diameter of the first portion is larger than the diameter of the annular portion.

The second portion further comprises an end portion connected to the annular portion.

The end portion comprises holes configured to accept fasteners.

The second portion comprises a first side and a second side that form the annular portion and the end portion, wherein a crimped portion of the first side and the second side form the end portion.

The end portion is connected to a portion of the annular portion opposite from a portion of the annular portion connected to the web portion.

The end portion is connected to a portion of the annular portion up to about 45 degrees from a portion of the annular portion opposite from a portion of the annular portion connected to the web portion.

A method of joining an engine clip or an engine clamp with an engine component includes inserting a first portion of an adapter clip into the engine clip or the engine clamp; and inserting the engine component into an annular portion of a second portion of the adapter clip, the annular portion being connected to the first portion via a web portion of the adapter clip; wherein a diameter of the first portion differs from a diameter of the annular portion.

An adapter clip includes a first portion, the first portion being annular and solid; a second portion including: an annular portion; and an end portion connected to the annular portion; and a web portion connected to the first portion and the annular portion of the second portion; wherein a diameter of the first portion differs from a diameter of the annular portion.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An adapter clip comprising:
   a first portion configured to fit within an engine clip or an engine clamp, wherein the first portion is solid;
   a second portion including an annular portion, the annular portion being configured to fit around an engine component; and
   a web portion connected to the annular portion and the first portion;
   wherein a diameter of the first portion differs from a diameter of the annular portion;
   wherein the web portion is between the first portion and the annular portion, and the web portion provides a space between the first portion and the annular portion so that the engine component is separated from the engine clip or the engine clamp; and
   wherein a length of the first portion is equal to a length of the annular portion, and the web portion extends an entirety of the length of the first portion and the length of the annular portion.

2. The adapter clip of claim 1, wherein the engine component is a harness.

3. The adapter clip of claim 2, wherein the second portion is configured to fit around a sleeve of the harness.

4. The adapter clip of claim 1, wherein the first portion is cylindrical.

5. The adapter clip of claim 1, wherein the diameter of the first portion is smaller than the diameter of the annular portion.

6. The adapter clip of claim 1, wherein the diameter of the first portion is larger than the diameter of the annular portion.

7. The adapter clip of claim 1, wherein the second portion further comprises an end portion connected to the annular portion.

8. The adapter clip of claim 7, wherein the end portion comprises holes configured to accept fasteners.

9. The adapter clip of claim 7, wherein the second portion comprises a first side and a second side that form the annular portion and the end portion, wherein a crimped portion of the first side and the second side form the end portion.

10. The adapter clip of claim 7, wherein the end portion is connected to a portion of the annular portion opposite from a portion of the annular portion connected to the web portion.

11. The adapter clip of claim 7, wherein the end portion is connected to a portion of the annular portion up to about 45 degrees from a portion of the annular portion opposite from a portion of the annular portion connected to the web portion.

12. A method of joining an engine clip or an engine clamp with an engine component, the method comprising:
   inserting a first portion of an adapter clip into the engine clip or the engine clamp; and
   inserting the engine component into an annular portion of a second portion of the adapter clip, the annular portion being connected to the first portion via a web portion of the adapter clip;
   wherein the first portion is solid;
   wherein a diameter of the first portion differs from a diameter of the annular portion;
   wherein the web portion is between the first portion and the annular portion, and the web portion provides a space between the first portion and the annular portion so that the engine component is separated from the engine clip or the engine clamp; and
   wherein a length of the first portion is equal to a length of the annular portion, and the web portion extends an entirety of the length of the first portion and the length of the annular portion.

13. An adapter clip comprising:
   a first portion, the first portion being cylindrical and solid;
   a second portion including:
      an annular portion; and
      an end portion connected to the annular portion; and
   a web portion connected to the first portion and the annular portion of the second portion;
   wherein a diameter of the first portion differs from a diameter of the annular portion;
   wherein the web portion is between the first portion and the annular portion, and the web portion provides a space between the first portion and the annular portion to avoid potential wear points; and
   wherein a length of the first portion is equal to a length of the annular portion, and the web portion extends an entirety of the length of the first portion and the length of the annular portion.

* * * * *